Dec. 15, 1931.  H. KLENCKE  1,836,176
PROCESS FOR TREATMENT OF GASES ARISING FROM
THE HEATING OF SULPHIDE ORES AND THE LIKE,
Filed Dec. 31, 1929

INVENTOR.
Hans Klencke.
BY
ATTORNEYS

Patented Dec. 15, 1931

1,836,176

UNITED STATES PATENT OFFICE

HANS KLENCKE, OF FRANKFORT-ON-THE-MAIN, GERMANY, ASSIGNOR TO INTERNATIONAL PRECIPITATION COMPANY, OF LOS ANGELES, CALIFORNIA, A CORPORATION OF CALIFORNIA

PROCESS FOR TREATMENT OF GASES ARISING FROM THE HEATING OF SULPHIDE ORES AND THE LIKE

Application filed December 31, 1929, Serial No. 417,786, and in Belgium January 28, 1929.

This invention relates to the electrical precipitation of dust or suspended matter from the gases arising from the sintering, roasting, volatilization or other heat treatment of ores and the like, and particularly from heating apparatus of the traveling charge type. The apparatus known as the Dwight-Lloyd straight line machine is an example of an apparatus of this type commonly used in the sintering, roasting or other heat treatment of ores and the like, and the description herein will be directed particularly to the carrying out of my invention in such an apparatus, although it will be understood that any other apparatus of the same general type may be used.

In the operation of apparatus of this type, a relatively thin layer or charge of ore or other material to be treated is caused to travel in a straight line path. At a point near the beginning of its travel the charge is ignited in any suitable manner and in the subsequent part of its travel air is drawn through the charge to maintain combustion of the sulphide constituent thereof, and the resulting gases containing both moisture and $SO_2$ are drawn off by suitable draft producing means.

In the electrical precipitation of suspended matter from the gases thus obtained, difficulties have arisen in obtaining efficient cleaning and satisfactory operation, but it has been found that these difficulties may be materially decreased by increasing the concentration of $SO_2$ and moisture in the gases. In order to remedy these difficulties, therefore, this invention provides for handling of these gases in such way that the gases drawn off from the first zone of the combustion region are not directly subjected to electrical precipitation but are first utilized to supply a part, at least, of the air required for combustion in the subsequent zone, thus decreasing the total amount of air supplied and increasing the $SO_2$ and moisture content of the gases leaving said subsequent zone.

It may be pointed out that the gases arising from the first zone are naturally somewhat richer in $SO_2$ and moisture, while the gases arising from the subsequent zone are relatively lean, and the circulation of the gas in the manner above described causes a considerable enrichment of these latter gases. The gases drawn off from the subsequent zone are then subjected to electrical precipitation for removal of suspended material therefrom, with materially better results than heretofore have been obtained. Another advantage of this method is that the precipitator may be of smaller size than in previous practice due to the decrease in total gas volume resulting from re-utilization of part of the air supply.

The accompanying drawings illustrate an apparatus of the above type and the manner of applying my invention thereto and referring to these drawings.

Figure 1:
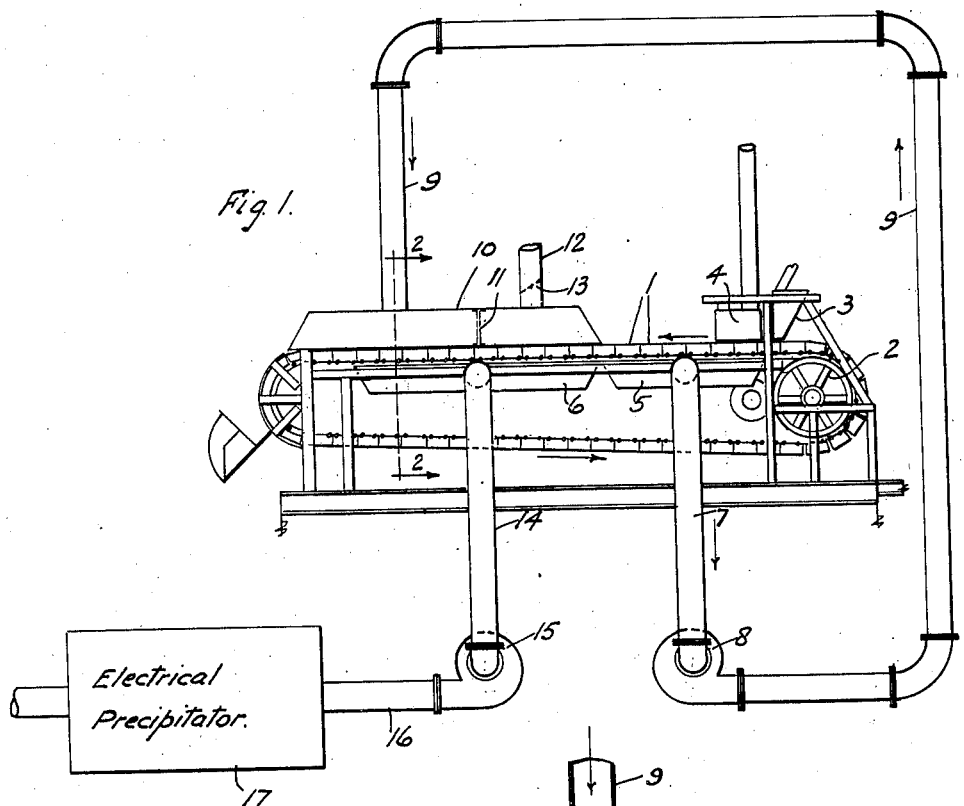
Fig. 1 is a semi-diagrammatic side elevation of such apparatus and of the means for handling the gases and delivering the same to an electrical precipitator.
Figure 2:
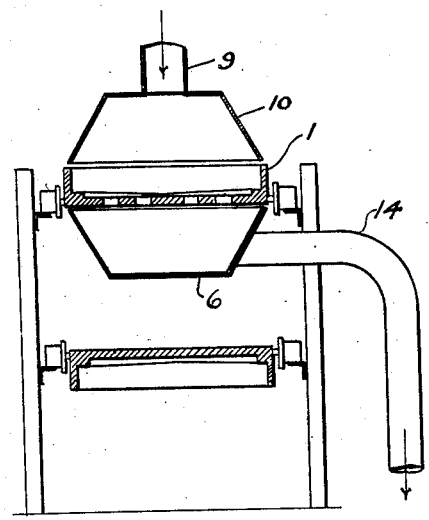
Fig. 2 is a transverse section on line 2—2 in Fig. 1.

The heat treating apparatus shown in the drawings represents a Dwight-Lloyd straight line machine, whose construction is well known, and a detailed description of the same is considered unnecessary. However, it may be said that such apparatus comprises essentially a succession of ore carrying elements commonly known as pallets, indicated at 1, having wheels at their ends traveling upon a pair of endless tracks so as to form in effect an endless conveyor. These pallets are caused to move around on these tracks by means of sprockets 2 adjacent the feed end of the machine, the direction of travel thereof being as indicated by the arrows in Fig. 1. The charge of ore or other material to be treated is delivered upon the pallets as they pass successively beneath a feed hopper 3, and the combustion of the sulphide constituent is initiated by a suitable igniter 4.

The pallets are provided in the usual manner with pervious or grate-like bottoms so that air may be drawn downwardly through the charge into suitable suction boxes extending beneath the pallets. In the present instance I have shown two such suction boxes indicated at 5 and 6 respectively, the horizontal extent of the suction box 5 corresponding approximately to a first zone of gases relatively rich in $SO_2$ and moisture, and the suction box 6 extending approximately throughout a subsequent zone of gases normally relatively lean in $SO_2$ and moisture.

According to the present invention the gases from the first suction box 5 are drawn through a flue 7 by means of a fan or blower 8 and are delivered thereby through flue 9 into an air box 10 extending over the top of the charge throughout the zone of the suction box 6. I may also desire in such cases, at least, to supply some additional air to the air box 10 and I have, therefore, shown such air box as provided with a partition 11 and with an air supply pipe 12 opening into said air box ahead of said partition and provided with a regulating damper 13, while the flue 9 opens into said air box beyond the partition 11. The gases are drawn from the suction box 6 through flue 14 by means of a fan or blower 15 whence they may be delivered through flue 16 to a suitable electrical precipitating apparatus indicated diagrammatically at 17.

In the operation of this apparatus the ore charge is supplied onto the pallets and ignited in the usual manner and is caused to travel successively over the suction boxes 5 and 6, the treated ore being discharged from the pallets at the other end of the machine in the usual manner. In passing over the suction box 5 air is drawn downwardly through the charge to support combustion of the sulphur content thereof. The gases entering said suction box, therefore, contain not only a considerable proportion of $SO_2$ but also a relatively high moisture content due to evaporation of moisture from the charge by the heat produced from such combustion. These relatively rich gases are then circulated by fan 8 through flues 7 and 9 into the air box 10. Any desired proportion of air may also be drawn into said air box through pipe 12, the proportion of this air to the gases delivered through flue 9 depending upon the adjustment of damper 13. It will, of course, be understood that while the gases delivered through flue 9 are relatively rich in $SO_2$ and moisture they still consist largely of air and are, therefore, able to support further combustion and effect further removal of sulphur and moisture from the ore. The gases entering the suction box 6 are therefore much richer in $SO_2$ and moisture than would be the case if only pure air were drawn through this part of the charge. These gases are then delivered through flues 14 and 16 by means of fan 15 to the electrical precipitator at 17 where the suspended material or dust is largely precipitated therefrom, and I have found that the enrichment of the gases in the manner above described serves to permit much more efficient and satisfactory operation of the electrical precipitator than is the case when the gases are merely withdrawn in the usual manner from the suction boxes and the entire body of such gases mixed and delivered directly to an electrical precipitator.

I claim:

A process for treatment of gases arising from a traveling charge operation for heat treatment of sulphide ores and the like, comprising drawing air through the first zone of the combustion region, utilizing the gases from this region and relatively rich in $SO_2$ and moisture to furnish part, at least, of the air supply for combustion in a subsequent zone, so as to cause the gases leaving said subsequent zone to be sufficiently rich in $SO_2$ to permit efficient electrical precipitation of suspended material therefrom, separately removing the gases from this subsequent zone and subjecting such gases to an electrical precipitating operation.

In testimony whereof I have hereunto subscribed my name this 6th day of December, 1929.

HANS KLENCKE.